US011223808B1

(12) United States Patent
Faragher et al.

(10) Patent No.: US 11,223,808 B1
(45) Date of Patent: Jan. 11, 2022

(54) DEVICE, SYSTEM AND METHOD FOR GENERATING A MAPPING OF PROJECTOR PIXELS TO CAMERA PIXELS AND/OR OBJECT POSITIONS USING ALTERNATING PATTERNS

(71) Applicant: CHRISTIE DIGITAL SYSTEMS USA, INC., Cypress, CA (US)

(72) Inventors: Chad Faragher, Kitchener (CA); Randy Spruyt, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 16/916,818

(22) Filed: Jun. 30, 2020

(51) Int. Cl.
*H04N 9/31* (2006.01)

(52) U.S. Cl.
CPC ................ *H04N 9/3194* (2013.01)

(58) Field of Classification Search
CPC ...... H04N 9/31; H04N 9/3141; H04N 9/3185; H04N 9/3194; G02B 30/56; G03B 21/147
See application file for complete search history.

(56) References Cited

U.S. PATENT DOCUMENTS

| | | | |
|---|---|---|---|
| 6,618,076 B1 | 9/2003 | Sukthankar et al. | |
| 10,630,948 B2* | 4/2020 | Post | H04N 9/3182 |
| 2007/0046924 A1* | 3/2007 | Chang | G01C 7/00 |
| | | | 356/3.01 |
| 2009/0086081 A1* | 4/2009 | Tan | G01B 11/2509 |
| | | | 348/333.1 |
| 2013/0063559 A1* | 3/2013 | Moshe | G01B 11/25 |
| | | | 348/43 |
| 2014/0037146 A1* | 2/2014 | Taguchi | G06T 7/521 |
| | | | 382/107 |
| 2016/0173842 A1* | 6/2016 | De La Cruz | H04N 9/3185 |
| | | | 353/70 |
| 2017/0078649 A1* | 3/2017 | Taubin | H04N 13/167 |
| 2020/0252591 A1* | 8/2020 | Post | H04N 9/3182 |
| 2021/0131799 A1* | 5/2021 | Nakamura | H04N 5/238 |

FOREIGN PATENT DOCUMENTS

EP 3035231 B1 2/2019

* cited by examiner

*Primary Examiner* — Brian P Yenke
*Assistant Examiner* — Humam M Satti
(74) *Attorney, Agent, or Firm* — Perry + Currier, Inc.

(57) ABSTRACT

A device, system and method for generating a mapping of projector pixels to camera pixels and/or object positions using alternating patterns is provided. A device controls a projector to project, while a camera acquires frames thereof, in a sequence: alternating patterns; and structured light patterns, the alternating patterns comprising first and second predetermined patterns projected before and/or after the structured light patterns. The device determines, using the frames as coordinated with the alternating patterns, one or more functions relating respective indices of the alternating patterns and the frames, on one or more of a camera pixel-by-pixel basis and a camera scan-line-by-scan-line basis. The device generates, and stores at a memory, a mapping of projector pixels to one or more of camera pixels and positions on an object in the overlapping fields-of-view, based on relating the frames with the structured light patterns using the one or more functions.

18 Claims, 10 Drawing Sheets

DEVICE, SYSTEM AND METHOD FOR GENERATING A MAPPING OF PROJECTOR PIXELS TO CAMERA PIXELS AND/OR OBJECT POSITIONS USING ALTERNATING PATTERNS

BACKGROUND

Projection mapping is often a very complicated process due to the careful alignment of projectors required to align numerous two-dimensional ("2D") projected images onto a three-dimensional ("3D") surface. Hence, the pose of each of the projectors relative to the surface needs to be calibrated, which is often performed using cameras acquiring images of the physical object as a projector is projecting many calibration test patterns (e.g. structured light patterns) onto the surface. For example, the structured light patterns generally comprise a series of binary patterns that enable the position of projector pixels to be found on the surface. In particular, images of the structured light patterns on the surface, captured by a camera, may be compared with the actual structured light patterns to determine a geometry of the projectors with respect to the surface and/or the geometry of the surface. The number of calibration test patterns may number in the tens or hundreds or more and hence a calibration may take a considerable amount of time to implement, which may increase a time from starting the projector to performing the projection mapping. Furthermore, the calibration may be complicated by the camera having a rolling shutter, and the like, and/or the projector using a color wheel, which may cause a frame of the camera to include pixels that capture more than one test pattern.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
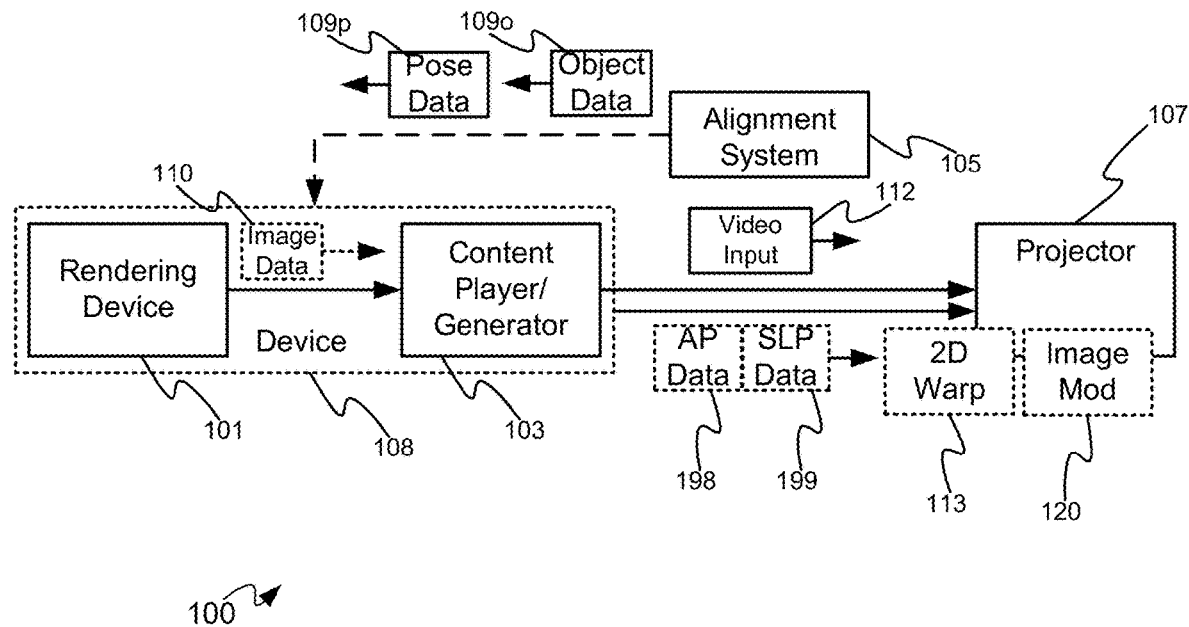
FIG. 1 depicts a projection system, according to non-limiting examples.

Machine-vision cameras are generally used to calibrate projectors for projection mapping for example. Projectors project images of structured light patterns (e.g. test patterns) onto an object, and cameras take pictures of the projected images of the structured light patterns. A computing device analyzes the pictures of the structured light patterns, and compares the pictures of the structured light patterns with the actual structured light patterns, to determine a mapping between the projector pixels and the camera pixels (and/or positions on the object onto which the structured light patterns are projected) such that digital corrections that can be made in a video processing pipeline to produce an image that, when projected onto the object, may be seamless in terms of content alignment, and uniform in terms of brightness and color. However, projecting and capturing the structured light patterns can be a slow process, for example due to implicit synchronization required to ensure a projector is projecting a given structured light pattern content prior to the camera capturing a frame of the given structured light pattern. Furthermore, the calibration may be complicated by the camera having a rolling shutter, and the like, and/or the projector using a color wheel, which may cause a frame of the camera to include more than one test pattern. As such, provided herein is a technique that may reduce a time period for projecting and capturing images of structured light patterns.

In particular, a timing calibration is performed between a projector and a camera in which predetermined alternating patterns (e.g. alternating black and white images) are projected by the projector and the camera acquires frames thereof, which may be used to generate a function relating respective indices of the alternating patterns and the frames of the camera, for example on a camera pixel-by-pixel basis and/or a pattern pixel-by-pixel basis, and the like. The function may be used to determine a structured light pattern index for a given camera pixel such that a given camera pixel of frames, captured while the structured light patterns are being projected, may be quickly related to a given structured light pattern.

As such, provided herein is a device comprising: a controller configured to communicate with a projector and a camera having overlapping fields-of-view, the controller configured to: control the projector to project, while the camera acquires frames thereof, in a sequence: alternating patterns; and structured light patterns, the alternating patterns comprising first predetermined patterns and second predetermined patterns projected one or more of before and after the structured light patterns; determine, using the frames as coordinated with the alternating patterns, one or more functions relating respective indices of the alternating patterns and the frames, on one or more of a camera pixel-by-pixel basis and a camera scan-line-by-scan-line basis; and generate, and store, at a memory, a mapping of projector pixels to one or more of camera pixels and positions on an object in the overlapping fields-of-view, based on relating the frames with the structured light patterns using the one or more functions.

Also provided herein is a method comprising: controlling, at a computing device, a projector to project, while a camera acquires frames thereof, in a sequence: alternating patterns; and structured light patterns, the alternating patterns comprising first predetermined patterns and second predetermined patterns projected one or more of before and after the structured light patterns; the projector and the camera having overlapping fields-of-view; determining, at the computing device, using the frames as coordinated with the alternating patterns, one or more functions relating respective indices of the alternating patterns and the frames, on one or more of a camera pixel-by-pixel basis and a camera scan-line-by-scan-line basis; and generating, at the computing device, and storing at a memory, a mapping of projector pixels to one or more of camera pixels and positions on an object in the overlapping fields-of-view, based on relating the frames with the structured light patterns using the one or more functions.

FIG. 1 depicts a system 100 comprising: a rendering device 101 (interchangeably referred to hereafter as the rendering device 101); a content player 103 (and/or content generator); an alignment system 105; and a projector 107. In general, the rendering device 101 is in communication with content player 103 and optionally alignment system 105, and content player 103 is in communication with projector 107.

As depicted, the rendering device 101 and the content player 103 are combined into one device 108, however in other implementations the rendering device 101 and the content player 103 can be separate devices. The alignment system 105 may be configured to generate pose data 109$p$ comprising at least data defining geometric relationships between, for example, the projector 107 and objects onto which the projector 107 projects.

Generally, the pose data 109$p$ comprises a location of the projector 107 (e.g. in "x,y,z" coordinates relative to the object) and an orientation of the projector 107 (e.g. a "yaw", a "pitch" and a "roll" relative to the object). However, the pose data 109$p$ may also comprise intrinsic properties of the projector 107, such as lens characteristics, and the like.

The rendering device 101 can generate rendered image data 110, for example by rendering existing image data (not depicted) for projection by the projector 107. The image data 110 may generally comprise two-dimensional images. The content player 103 may combine the image data 110 with the pose data 109$p$ (and object data 109$o$) received by the alignment system 105 to produce video input 112, which comprises the image data 110 altered for a perspective for projection on an object by the projector 107. In FIG. 1, solid lines connecting components show flow of image and/or video data there between, while the stippled line connecting the alignment system 105 to the rendering device 101 and/or device 108 shows flow of the pose data 109$p$ and the object data 109$o$ there between. The object data 109$o$ generally comprises a model of a location and orientation of the object onto which images from the projector 107 are projected, and can be provided with the object and/or determined by the alignment system 105 using one or more cameras.

When the rendering device 101 and the content player 103 are separate, the rendering device 101 communicates the image data 110 to the content player 103, which processes and/or "plays" the image data 110 by producing the video input 112 suitable for processing and projection by the projector 107. For example, the image data 110 can include, but is not limited to, an AVI file, a series of JPG files, a PNG file, and the like. The video input 112 can include, but is not limited to, High-Definition Multimedia Interface (HDMI) data, Digital Visual Interface (DVI) data, DisplayPort (DP) data, Video over Internet Protocol (IP) data, Video Graphics Array (VGA) data, and/or video transport data.

When the rendering device 101 and the content player 103 are combined in device 108, device 108 can render the video input 112 (e.g. video data) in real-time without producing the image data 110. In any event, the video input 112 is communicated to the projector 107 by the content player 103 where the video input 112 is used to control the projector 107 to project images based thereupon, for example onto a three-dimensional object. The video input 112 may comprise images for projection onto the three-dimensional object, for example the image data 110 altered for the perspective of the projector 107 relative to the three-dimensional object, as determined using the pose data 109$p$ and/or the object data 109$o$; however the video input 112 may further comprise the pose data 109$p$, extrinsic properties of the projector 107, settings for the projector, and the like.

The rendering device 101 generally comprises an image generator and/or renderer, for example a computing device, a server and the like, configured to generate and/or render images as the image data 110. Such the image data 110 can include, but is not limited to, still images, video and the like. Furthermore, though not depicted, the rendering device 101 can be in communication with, and/or comprise, an image generator and/or a memory storing data from which the image data 110 can be generated and/or rendered. Alternatively, the rendering device 101 can generate the image data 110 using algorithms, and the like, for generating images.

The content player 103 comprises a player configured to "play" and/or render the image data 110 for example according to the pose data 109$p$. When the image data 110 comprises video data, the content player 103 is configured to play and/or render the video data by outputting the video input 112 for projection by the projector 107. Hence, the content player 103 can include, but is not limited to a video player, a video processing device, a computing device, a server, and the like. However, as described above, when the rendering device 101 and the content player 103 are combined as device 108, rendering of the image data 110 can be eliminated and device 108 renders the video input 112 without producing the image data 110.

The projector 107 comprises a projector configured to project the video input 112, including but not limited to a digital projector, a cinema projector, an LCOS (Liquid Crystal on Silicon) based projector, a DMD (digital micromirror device) based projector and the like. Furthermore, while only one the projector 107 is depicted, system 100 can comprise a plurality of projectors 107, each configured to project respective projection data comprising, for example, portions of larger tiled image to be projected. Regardless of a technology used in the projector 107, it is assumed that the projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 further comprises one or more 2D ("two-dimensional") warping devices and/or modules 113, for example at the projector 107 (though such a warping device can be present at the content player 103 and/or as a stand-alone device) The video input 112 can be warped by the warping module 113, for example by moving and/or adjusting pixels within the video input 112, to adjust the video input 112 for projection by the projector 107 onto an object including, but not limited to, a screen, an object and the like. In some implementations, the warping module 113 can be used to make small changes to projection of images onto a physical object, for example when a virtual model of the object used to produce the images does not precisely match the physical object. Furthermore, the warping module 113, and the like, may be used to alter the video input 112 to blend images projected in a multi-projector system.

In general, the alignment system 105 comprises any suitable combination of projectors (including the projector 107), cameras (not depicted in FIG. 1), and computing devices which may be configured to one or more of: control the projector 107 to project, while a camera acquires frames thereof, in a sequence: alternating patterns; and structured light patterns, the alternating patterns comprising first predetermined patterns and second predetermined patterns projected one or more of before and after the structured light patterns, the projector 107 and the cameras having overlapping fields-of-view; determine, using the frames as coordinated with the alternating patterns, one or more functions relating respective indices of the alternating patterns and the frames; and generate, and store, at a memory (e.g. (e.g. of a device 108), a mapping of projector pixels to one or more of camera pixels and positions on an object in the overlapping fields-of-view, based on relating the frames with the structured light patterns using the one or more functions. Non-limiting implementations of the alignment system 105 will be described below with reference to FIG. 2 to FIG. 10.

Also depicted in FIG. 1, system 100 optionally further comprises one or more image modification devices and/or modules 120, for example at the projector 107 (though such an image modifications device can be present at content player and/or as a stand-alone device) When present, video input 112 can be modified by the image modification module 120, for example, by altering the video input 112 to include other images, such as structured light patterns, as described in more detail below. In some examples warping module 113 and the image modification module 120 may be integrated with each other. The image modification module 120 may be external to, or integrated with, the projector 107. In yet further examples, functionality of the image modification module 120 may be integrated with the projector 107. In some examples, the image modification module 120 may be controlled by the alignment system 105.

While each of the rendering device 101, the content player 103, the alignment system 105, and the projector 107 are depicted as distinct components, in other implementations, respective portions of one or more of the rendering device 101, the content player 103, the alignment system 105, and the projector 107 and can be implemented within the same device (e.g. device 108) and/or processing resources can be shared there between including, but not limited to, in a cloud computing arrangement. For example, while not depicted, system 100 comprises one or more controllers, one or more processors, one or more memories and one or more communication interfaces, for example a controller, memory and communication interface for each of the rendering device 101, the content player 103, the alignment system 105, and the projector 107 and/or to be shared among the rendering device 101, the content player 103, the alignment system 105, and the projector 107. In general, components of system 100, as depicted, represent different functionality of a projection system where: the pose data 109$p$ of the projector 107 can be automatically determined. In some implementations, system 100 includes components and/or functionality for projection mapping onto three-dimensional objects and/or for updating the pose data 109$p$ when the projector 107 moves, and/or a screen and/or object, onto which images are being projected, moves.

As depicted, the device 108 and, the like is furthermore providing predetermined alternating pattern (AP) data 198 and structured light pattern (SLP) data 199 to the projector 107, for example for incorporation into images to be projected by the projector 107, as described below. For example, one or more of the rendering device 101, the content player 103 and the device 108 may store the data 198, 199 and provide the data 198, 199 (and/or images generated from the data 198, 199) to the projector 107. In other examples, the projector 107 may be preconfigured with the data 198, 199.

Figure 2:
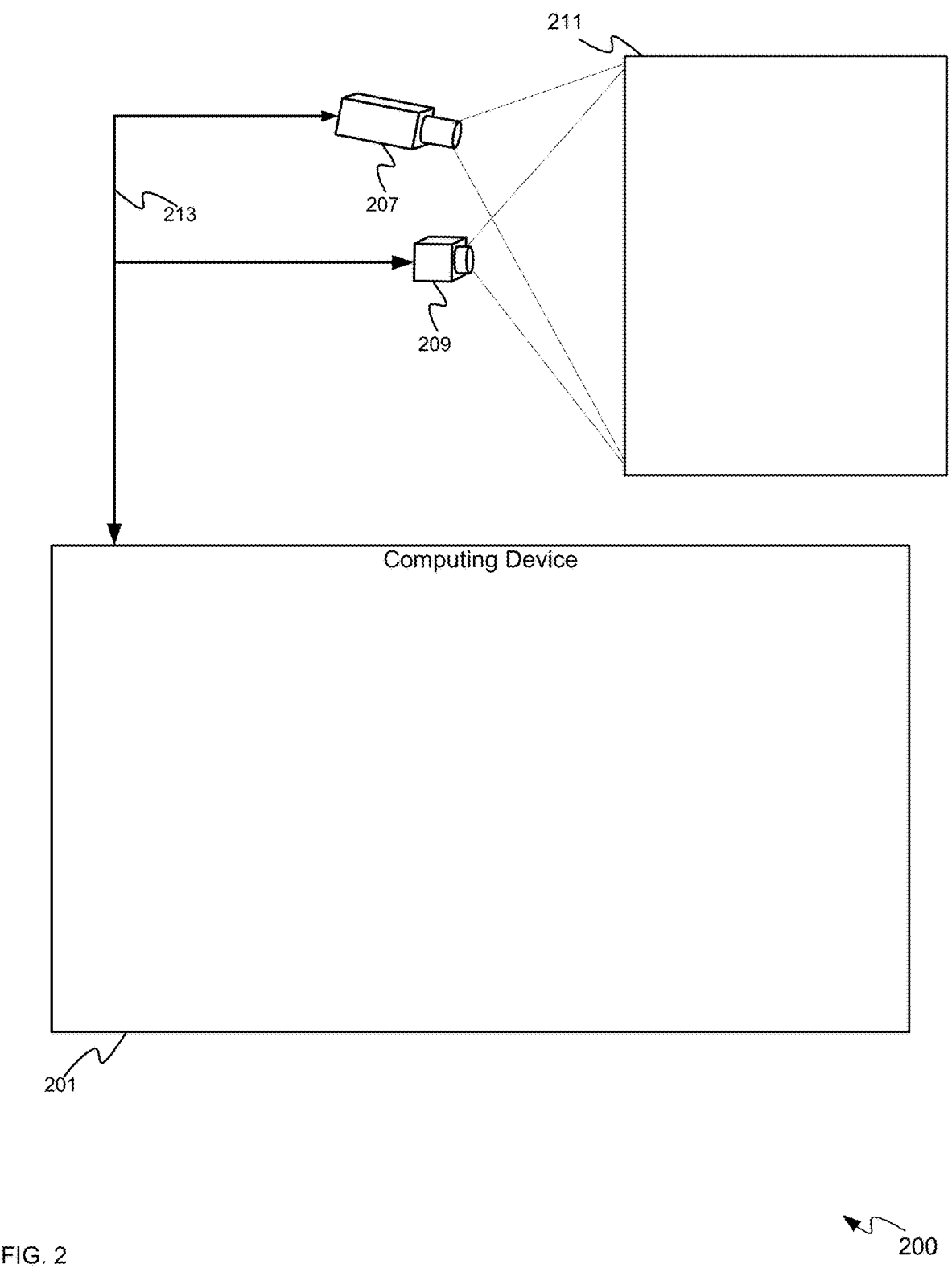
FIG. 2 depicts a system for generating a mapping of projector pixels to camera pixels and/or object positions using alternating patterns, according to non-limiting examples.

Attention is next directed to FIG. 2 which depicts a system 200 for generating a mapping of projector pixels to camera pixels and/or object positions using alternating patterns. The alignment system 105 can comprise the system 200, and furthermore components of the system 100 can comprise components of the system 200 as desired.

The system 200 comprises a computing device 201 interchangeably referred to hereafter as the device 201), a projector 207 and a camera 209 arranged relative to a physical object 211 onto which images are to be projected, for example in a projection mapping "show"; as depicted the physical object 211 comprises a surface and/or a screen, however projection mapping may occur on any physical object including, but not limited to, three-dimensional physical objects, such as curved surfaces, buildings, and the like. While only one projector 207 and one camera 209 are depicted, the system 200 may comprise any number of projectors and camera including. Furthermore, while not depicted in FIG. 2, as described below with respect to FIG. 3, the device 201 comprises a controller, a memory and communication interface.

In particular, the field of view of the camera 209 overlaps with at least a portion of a field of view of the projector 207 such that the camera 209 may acquire frames (e.g. images) of images projected by the projector 207. For clarity, the term "frame" is used herein with regards to data acquired by the camera 209 to distinguish such data from "images" projected by the projector 207. However, a frame acquired by the camera 209 is understood to include images and/or pictures acquired by the camera 209. The term "images" projected by the projector 207 may be interchangeably referred to as "projected images", and the like, and the term "frames" acquired by the camera 209 may be replaced with the term "camera images", and the like.

However, a term "frame rate" may be used with respect to the projector 207 projecting images and the camera 209 acquiring frames. For example, a projector frame rate of the projector 207 may comprise a rate (e.g. in frames per second) at which the projector 207 projects images, and a projector frame period may comprise a time during which the projector 207 projects one "frame" of an image (e.g. the projector 207 may project frames according to the projector frame rate and a projected image may be composed of a plurality of projected frames; as such, as described below with respect to FIG. 10, a projector image duration and/or projector pattern duration, described below, may be increased or decreased by increasing or decreasing a number of projector frames of an image). Similarly, a camera frame rate of the camera 209 may comprise a rate (e.g. in frames per second) at which the camera 209 acquires frames.

In some examples, as depicted, the camera 209 is arranged and/or configured to acquire frames of the entirety of projected images projected onto the object 211 by the projector 207. Hence, in examples described hereafter, functionality of the device 201 will be described with respect to the one projector 207 and the one camera 209, though functionality of the device 201 may include combining frames of the projected images, as projected onto the object 211 by the projector 207, by more than one camera. Furthermore, the camera 209 generally comprise an electronic and/or digital camera and/or video camera including, but not limited to charge couple device (CCD) based cameras.

As depicted, the device 201 comprises a computing device that may control the projector 207 to project images, alternating light patterns, structured light patterns, and the like, and further control the camera 209 to acquire frames of the alternating light patterns and the structured light patterns. The device 201 may be a device of the alignment system 105 and/or another computing device. As depicted, the device 201 is in communication with the projector 207 and the camera 209 via respective wired and/or wireless communication links 213.

The projector 207 is generally configured to project structured light patterns as part of a calibration of the system 200 using the structured light pattern data 199, and the like, which may comprise ten or more structured light patterns (e.g. independent structures (e.g. non-overlapping) centered around given projector pixels, vertical and horizontal stripes of increasing or decreasing resolution, checkerboard patterns of increasing or decreasing resolution, and the like, and/or data for generating such structured light patterns). However, any suitable number and/or type of structured light patterns is within the scope of the present specification. In general, the structured light patterns are configured to uniquely illuminate different portions of one or more of the overlapping fields-of-view (e.g. of the projector 207 and the camera 209) and the object 211.

Similarly, as will be described hereafter, the projector 207 is generally configured to project predetermined alternating patterns as part of a full calibration the system 200 using the alternating pattern data 198, and the like, which may comprise two or more first predetermined patterns (e.g. white images) alternating with second predetermined patterns (e.g. black images) projected one or more of before and after the structured light patterns. However, any suitable number and/or type of alternating patterns is within the scope of the present specification; for example, rather than white, light grey images may be projected and, rather than black, darker grey images may be projected. Alternatively, patterns of different colors may be projected. Any suitable combination of alternating patterns is understood to be within the scope of the present specification as long as the alternating patterns are predetermined such that the device 201 may determine which pixels and/or scan lines of frames acquired by the camera 209 correspond to a color and/or RGB (red-green-blue) value of an alternating pattern. While the alternating patterns are described herein with respect to two predetermined patterns which alternate, in other examples the alternating patterns may include any suitable number of alternating patterns. In particular, a given pattern, of the alternating patterns, may comprise images that are entirely one color and/or RGB value, and the like (e.g. including, but not limited to, all white images, all black images, etc.). Hence, the alternating patterns may comprise, for example, first predetermined patterns and/or first full images of a single first color and second predetermined patterns and/or second full images of a single second color, wherein "white" and "black" are understood to be colors within the scope of the present specification.

The frames of the camera 209 acquired while the projector 207 is projecting the alternating patterns may be used by the device 201 to determine functions relating respective indices of the alternating patterns and the frames, on one or more of a camera pixel-by-pixel basis, a pattern pixel-by-pixel basis, a camera scan-line-by-scan-line basis and/or a pattern line-by-line basis. Such functions may be used by the device 201 to determine which pixels and/or scan lines of frames acquired by the camera 209 while the projector 207 is projecting the structured light patterns correspond to given structured light patterns. Such correspondence may hence be used to generate a mapping of projector pixels to camera pixels and/or to positions on the object 211, such that images may be generated by the system 200 and/or the system 100 for projection mapping onto the object 211.

Figure 3:
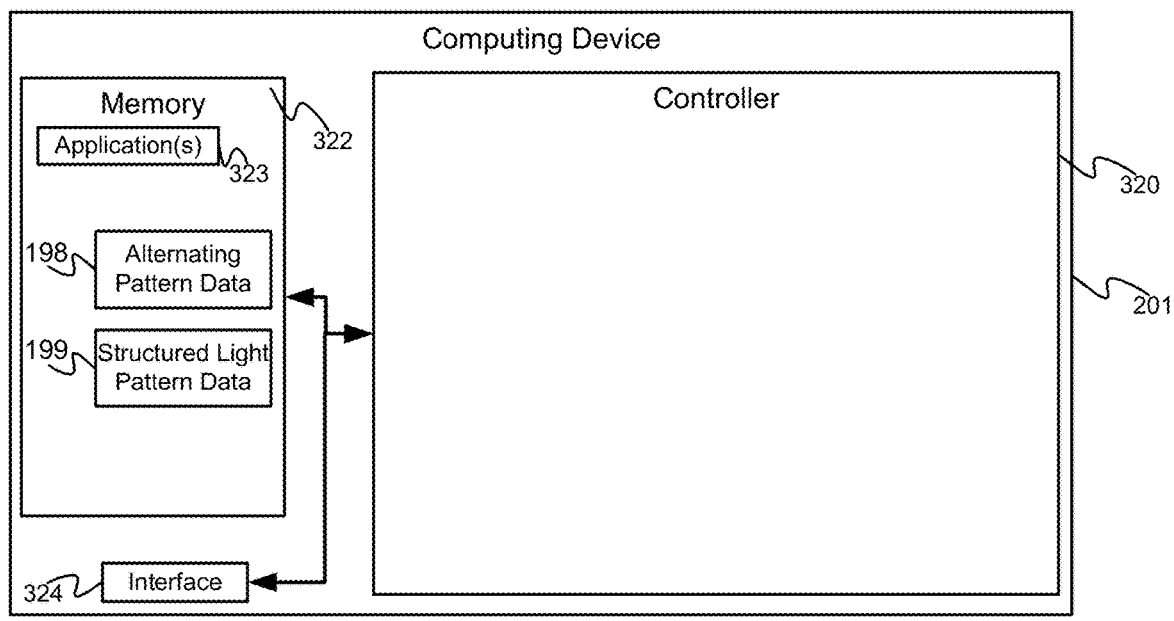
FIG. 3 depicts a block diagram of a computing device for generating a mapping of projector pixels to camera pixels and/or object positions using alternating patterns, which can be used in the system of FIG. 1, according to non-limiting examples.

Details of the device 201 are now described with respect to FIG. 3. The device 201, can comprise any suitable computing device, including but not limited to a graphics processing unit (GPU), a graphics processing device, a graphics processing engine, a video processing device, a personal computer (PC), a server, and the like, and generally comprises: a controller 320; a memory 322 storing one or more applications 323, the alternating pattern data 198, the structured light pattern data 199; and a communication interface 324 (interchangeably referred to hereafter as the interface 324). While the memory 322 is depicted as internal to the device 201, the memory 322 may be external to the device 201 and the controller 320 may have access to the memory 322 via the interface 324. Furthermore, while the data 198, 199 are depicted as stored in the memory 322, the data 198, 199 and/or the alternating patterns and the structured light patterns may alternatively be generated by the controller 320, for example when the controller 320 is implementing the one or more applications 323; in particular, the memory 322 may alternatively store data for the alternating patterns and the structured light patterns.

Each of the one or more applications 323 may be similar, but for a different mode and/or calibration mode of the system 200 and/or the device. For simplicity, the one or more applications 323 will be interchangeably referred to hereafter as the application 323. For example, in an initial calibration mode, the device 201 may operate using the alternating pattern data 198 and the structured light pattern data 199 to initially calibrate the system 200 to obtain one or more functions relating respective indices of the alternating patterns and the frames, on one or more of a camera pixel-by-pixel basis, a pattern pixel-by-pixel basis, a camera scan-line-by-scan-line basis and/or a pattern line-by-line basis, as described in more detail below. However, after the functions are obtained, in a later calibration mode, the device 201 may operate using the structured light pattern data 199, without the alternating pattern data 198, to perform another calibration, but using the existing one or more functions. However, the initial calibration may be performed at any suitable time.

While not depicted, the memory 322 may further store characteristics of the projector 207 (e.g. intrinsic characteristics and/or extrinsic characteristics and which may include a portion of determined pose data of the projector, such as the pose data 109$p$) and characteristics of the camera 209 (e.g. intrinsic characteristics and/or extrinsic characteristics and which may include a portion of determined pose data of the camera 209). While not depicted, the memory 322 may further store a model of the object 211 (e.g. the object data 109*o*), which may be obtained from a mathematical description (when available) and/or using laser-scanning techniques, and/or a computer aided drawing (CAD) model of the object 211 may be available (e.g. the object data 109*o*). In particular, characteristics of the projector 207 and the model of the object 211 may be used to determine the pose data 109*p* of the projector 207 via the alternating pattern data 198 and the structured light pattern data 199, with the frames of the alternating patterns and the structured light patterns, when projected by the projector 207 and acquired by the camera 209.

The interface 324 comprises any suitable wired or wireless communication interface configured to communicate with the projector 207 and the camera 209. The interface 324 may communicate in a wired and/or wireless manner as desired including, but not limited using cables, WiFi communication links, Bluetooth™ communication links, personal area networks, local area networks, and the like.

The controller 320 can comprise a processor and/or a plurality of processors, including but not limited to one or more central processors (CPUs) and/or one or more graphics processing units (GPUs) and/or one or more processing units; either way, the controller 320 comprises a hardware element and/or a hardware processor. In some implementations, the controller 320 can comprise an ASIC (application-specific integrated circuit) and/or an FPGA (field-programmable gate array) specifically configured for generating a mapping of projector pixels (e.g. of the projector 207) to camera pixels (e.g. of the camera 209) and/or object positions (e.g. of the object 211) using alternating patterns. Hence, the device 201 may preferably not be a generic computing device, but a device specifically configured to implement specific functionality for generating a mapping of projector pixels to camera pixels and/or object positions using alternating patterns. For example, the device 201 and/or the controller 320 can specifically comprise a computer executable engine configured to implement functionality for generating a mapping of projector pixels to camera pixels and/or object positions using alternating patterns.

The memory 322 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the device 201 as described herein are typically maintained, persistently, in the memory 322 and used by the controller 320 which makes appropriate utilization of volatile storage during the execution of such programming instructions. Those skilled in the art recognize that the memory 322 is an example of computer readable media that can store programming instructions executable on the controller 320. Furthermore, the memory 322 is also an example of a memory unit and/or memory module and/or a non-volatile memory.

In particular, the memory 322 stores the application 323 that, when processed by the controller 320, enables the controller 320 and/or the device 201 to: control the projector 207 to project, while the camera 209 acquires frames thereof, in a sequence: alternating patterns; and structured light patterns, the alternating patterns comprising first predetermined patterns and second predetermined patterns projected one or more of before and after the structured light patterns; determine, using the frames as coordinated with the alternating patterns, one or more functions relating respective indices of the alternating patterns and the frames; and generate, and store, at the memory 322 (and/or another suitable memory), a mapping of projector pixels to one or more of camera pixels and positions on an object in the overlapping fields-of-view, based on relating the frames with the structured light patterns using the one or more functions.

Figure 4:
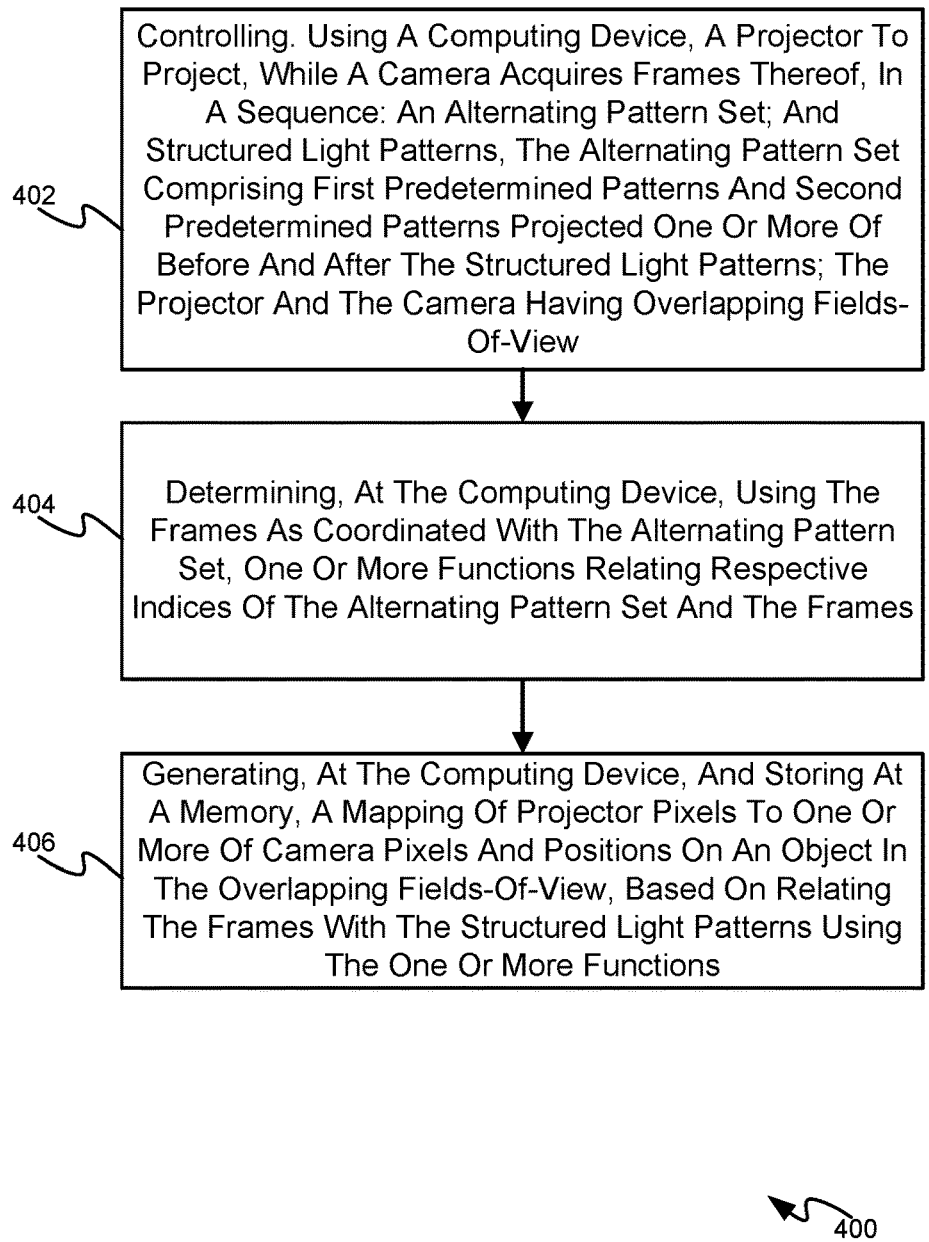
FIG. 4 depicts a method for generating a mapping of projector pixels to camera pixels and/or object positions using alternating patterns, and according to non-limiting examples.

Attention is now directed to FIG. 4 which depicts a flowchart of a method 400 for generating a mapping of projector pixels to camera pixels and/or object positions using alternating patterns according to non-limiting examples. The operations of the method 400 may correspond to machine readable instructions that are executed by the device 201, and specifically the controller 320 of the device 201. In the illustrated example, the instructions represented by the blocks of FIG. 4 are stored at the memory 322 for example, as the application 323. The method 400 of FIG. 4 is one way in which the controller 320 and/or the device 201 and/or the system 200 may be configured. Furthermore, the following discussion of the method 400 of FIG. 4 will lead to a further understanding of the system 100, and its various components The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 200, as well (including, but not limited to, the system 100).

At a block 402, the controller 320 and/or the device 201 controls the projector 207 to project, while the camera 209 acquires frames thereof, in a sequence: alternating patterns; and structured light patterns, the alternating patterns comprising first predetermined patterns (e.g. of a first color) and second predetermined patterns (e.g. of a second color) projected one or more of before and after the structured light patterns. It is understood that the first predetermined patterns are different from the second predetermined patterns. As described above, the first predetermined patterns may comprise white images, and the second predetermined patterns may comprise black images such that the alternating patterns comprise alternating white and black images.

For example, the controller 320 and/or the device 201 may control the projector 207 to project a portion of the alternating patterns prior to the structured light patterns being projected and/or the controller 320 and/or the device 201 may control the projector 207 to project a portion of the alternating patterns after the structured light patterns are projected.

Put another way, the alternating patterns may comprise a first set of the first predetermined patterns and the second predetermined patterns projected before the structured light patterns, and a second set of the first predetermined patterns and the second predetermined patterns projected after the structured light patterns.

In a particular example, the alternating patterns may comprise first alternating patterns projected before the structured light patterns comprising: three white images (e.g. patterns) alternately projected with black images (e.g. patterns). Similarly, the alternating patterns may comprise second alternating patterns projected after the structured light patterns comprising: three white images (e.g. patterns) alternately projected with black images (e.g. patterns). For example, the first alternating patterns may comprise: a first black image (e.g. pattern) projected for a period of time, then a first white image (e.g. pattern), then a second black image (e.g. pattern), then a second white image (e.g. pattern), then a third black image (e.g. pattern), then a third white image (e.g. pattern), then a final fourth black image (e.g. pattern). Similarly, the second alternating patterns may comprise a first black image (e.g. pattern) projected after the structured light patterns, then a first white image (e.g. pattern), then a second black image (e.g. pattern), then a second white image (e.g. pattern), then a third black image (e.g. pattern), then a third white image (e.g. pattern), then a final fourth black image (e.g. pattern). The images and/or patterns, other than the first black image of the first alternating patterns, and the last and/or fourth black image of the second alternating patterns may each be projected for a same time period (e.g. according to a projector pattern duration time); similarly, the structured light patterns may each be projected for the same time period as the alternating patterns. However, the first black image of the first alternating patterns, and the last and/or fourth black image of the second alternating patterns may be projected for longer than the other images and/or patterns.

Put another way, the alternating patterns may comprise a first set of the first predetermined patterns (e.g. white images) and the second predetermined patterns (e.g. black images) projected before the structured light patterns and a second set of the first predetermined patterns (e.g. white images) and the second predetermined patterns (e.g. black images) projected after the structured light patterns. Put yet another way, the first set and the second set of the first predetermined patterns and second predetermined patterns respectively comprise: three of the first predetermined patterns which alternate with the second predetermined patterns therebetween.

In general, the patterns are projected as quickly as possible, though the camera frame rate is considered when configuring the time period used to project the patterns. While described in detail below, it is understood that the method 300 may further include the controller 320 and/or the device 201 controlling one or more of a projector pattern duration, a camera frame rate and a camera exposure time (and/or a relative phase and/or delay time between the projected patterns and the acquired frames) to one or more of: maximize a number of the frames of the alternating patterns; minimize a respective number of frames which overlap adjacent patterns; and control the projector pattern duration to be greater than a camera frame period plus a camera exposure period.

Regardless, while the projector 207 is projecting the alternating patterns and the structured light patterns, the camera 209 is acquiring frames thereof, described in more detail below. In general, as will also be described below, the controller 320 and/or the device 201 coordinates pixels of the frames from the camera 209 with indices of the alternating patterns on a camera pixel-by-pixel basis and/or a camera scan-line-by-scan-line basis. For example, as the camera 209 may comprise a rolling shutter, "lines" of pixels may be acquired relatively simultaneously by the camera 209 as the shutter "rolls" in front of a CCD (and the like) of the camera 209. In particular, a scan line of a frame may comprise a row or a column of pixels of the frame (e.g. depending on whether the shutter is rolling across the rows or the columns of the CCD). Similarly, a line of a pattern may comprise a corresponding line or lines (e.g. a row or rows) of an alternating pattern and/or a structured light pattern).

Such coordination is explained with regards to the example of the projector 207 being controlled to project alternating white and black images and/before and after the structured light patterns.

For example, the alternating patterns and the structured light patterns may be assigned integer and/or whole number indices which may be referred to as pattern set indices. For example, with respect to the first alternating patterns, the first white image and/or pattern, following the first black image or pattern, may be assigned an index of "1" and/or any other suitable number, the second black image and/or pattern may be assigned an index of "2" (e.g. plus "1" with respect to the index of the first white image), and so on, until the fourth black image and/or pattern prior to the structured light patterns may be assigned an index of "6". The first structured light pattern may be assigned an index of "7", the second structured light pattern may be assigned an index of "8", and so on. Similarly, with respect to the second alternating patterns the first black image and/or pattern, may be assigned an index of "N+1" where "N" is the last index of the last structured light pattern, the first white image and/or pattern may be assigned an index of "N+2", and so on.

In particular, when the controller 320 and/or the device 201 is processing the frames acquired by the cameras 209, to determine which pixels and/or scan lines of which frames correspond to the alternating patterns, a first white pixel and/or first white scan line of frames of the camera 209 that follow first black pixels and/or black scan lines may be determined to correspond to the first white image and/or pattern of the first alternating patterns (e.g. with an index of "1", and the like). Similarly, a second white pixel and/or second white scan line of frames of the camera 209 that second black pixels and/or black scan lines following the first white pixel and/or the first white scan line may be determined to correspond to the second white image and/or pattern (e.g. with an index of "3"), and so on. A similar process may be used to coordinate pixels and/or scan lines of the frames with the second alternating patterns, but working backwards from the black pixels and/or black scan lines; in other words, the last white pixel and/or scan line preceding last black pixels and/or scan lines of the frames may be determined to correspond with the third white image and/or pattern of the second alternating patterns, and so on.

However, in some examples, as described in more detail below, the projector 207 may include a color wheel, and the like, and the alternating patterns may be projected as RGB images (e.g. a red image, then a green image then a blue image and/or the RGB images being in any suitable order), for example to form a white image; as such, the camera 209 (e.g. due to a rolling shutter) may capture portions of frames of the alternating patterns as RGB images are changing and/or in a manner such that pixels and/or scan lines of the frames captured by the camera 209 have a particular color which may or not "white". As such, pixels and/or scan lines may be assigned a fractional index (e.g. a real number that is not an integer number and/or a whole number, such "0.8", "1.2", etc.), which may be related to a corresponding alternating pattern. Put another way, the method 300 may further comprise the controller 320 and/or the device 201 assigning a fractional index to one or more of the frames, pixels and scan lines thereof, on the basis of respective colors thereof, to determine the one or more functions relating the respective indices of the alternating patterns and the frames.

Put another way, the method 300 may further comprise the controller 320 and/or the device 201 coordinating the frames acquired by the camera 209 with the alternating patterns by identifying one or more of: an initial first predetermined pattern projected before the structured light patterns; and a last first predetermined pattern projected after the structured light patterns.

Such coordination is generally performed for each pixel and/or for each scan line of the frames acquired by the camera 209. Furthermore, such coordination may be performed using a camera frame index for a pixel and/or a scan line. For example, the camera frames may also be assigned integer and/or whole number indices, which may be referred to as camera frame indices. In particular, a given pixel and/or a given scan line of a camera frame is understood to be assigned the camera frame index of the camera frame of which the given pixel and/or the given scan line is component. Hence, the coordination of the coordinating of the frames acquired by the camera 209 with the alternating patterns may comprise coordinating a camera frame index for a pixel and/or a scan line with a pattern set index.

At a block 404, the controller 320 and/or the device 201 determines using the frames as coordinated with the alternating patterns, one or more functions relating respective indices of the alternating patterns and the frames, on one or more of a camera pixel-by-pixel basis, pattern pixel-by-pixel basis, a camera scan-line-by-scan-line basis, and a pattern line-by-line basis.

Hence, in general, the alternating patterns are used to generate the function and/or functions of the block 404, which are then used to coordinate pixels and/or scan lines of frames of the structured light patterns, with pixels and/or lines of the structured light patterns.

In some examples, one or more functions comprise a single function which relates a camera frame index, a pattern set index and a scan line number. For example, a scan line number (which may comprise a scanline row number or a scanline column number depending on whether a rolling shutter of the camera 209 is rolling across rows or columns of the CCD of the camera 209). In these examples, a scan line number of a pixel and/or scan line, and a camera frame index of the camera frame of which the pixel and/or the scan line is a component, may be input into the single function to determine which pattern set index (e.g. of the structured light patterns) corresponds to the pixel and/or the scan line identified by the scan line number and the camera frame index.

In some examples, as the alternating patterns and the structured light patterns are all projected for a same time period, the single function may have a planar format of:

$$Y = b_0 + b_1 X_1 + b_2 X_2 \quad \text{Equation (1)}$$

In Equation (1), "Y" comprises a pattern index, "$X_1$" comprises a camera frame index, and "$X_2$" comprises a scan line number of a pixel and/or scan line of the camera frame. The factors "$b_0$", "$b_1$", "$b_2$" are determined by using regression techniques, and the like, on the known camera frame indices coordinated with the known pattern indices of the alternating patterns, and using known scan line indices of the associated pixels and/or scan lines of the frames of the alternating patterns.

Alternatively, the one or more functions may comprise a plurality of functions which relates a camera frame index to a pattern set index for one or more of each camera pixel and each camera scanline. In a particular example, as the alternating patterns and the structured light patterns are all projected for a same time period, the plurality of functions comprise linear functions of:

$$y = mx + b \quad \text{Equation (2)}$$

In Equation (2), "y" comprises a pattern index, and "x" comprises a camera frame index. The factors "m", and "b", are determined by using regression techniques, and the like, on the known camera frame indices coordinated with the known pattern indices of the alternating patterns, for a given pixel and/or scan line of the frames of the alternating patterns. Put another way, Equation (2) is a special case of Equation (1), for a given pixel and/or scan line; hence, for example, the factors "$b_0$", "$b_1$" of Equation (2) are respectively similar to the factors "b", and "m" of Equation (1). Put another way, the factor $b_2 X_2$ of Equation (1) will be a constant for a particular scan line and the factor "b" of Equation (2) combines the factors $b_2 X_2$ and $b_0$ of Equation (1).

At a block 406, the controller 320 and/or the device 201 generates, and stores, at the memory 322 (and/or another suitable memory), a mapping of projector pixels to one or more of camera pixels and positions on an object in the overlapping fields-of-view, based on relating the frames with the structured light patterns using the one or more functions.

For example, at the block 406, the controller 320 and/or the device 201 uses the one or more functions generated at the block 404 to determine which pixels of the camera 209 correspond to particular pixels of the projector that projected a pixel of the structured light patterns to map the camera pixels to the projector pixels using any suitable technique. When, for example, a model of the object 211 is also provided (e.g. the object data 109o), a mapping of the camera pixels to the projector pixels may also be used to generate a mapping of the projector pixels to positions on the object 211 and/or a mapping of the camera pixels to positions on the object 211; and/or a point cloud of the object 211 may be obtained and/or generated to perform a similar function. Regardless, once a mapping is obtained, such a mapping may be used as input to system 100, for example via the pose data 109p (and/or such a mapping may be used to generate at least a portion of the pose data 109p) to generate images for projection mapping onto the object 211.

The method 300 is next described in more detail with respect to FIG. 5, FIG. 6, FIG. 7, FIG. 8, FIG. 9 and FIG. 10.

Figure 5:
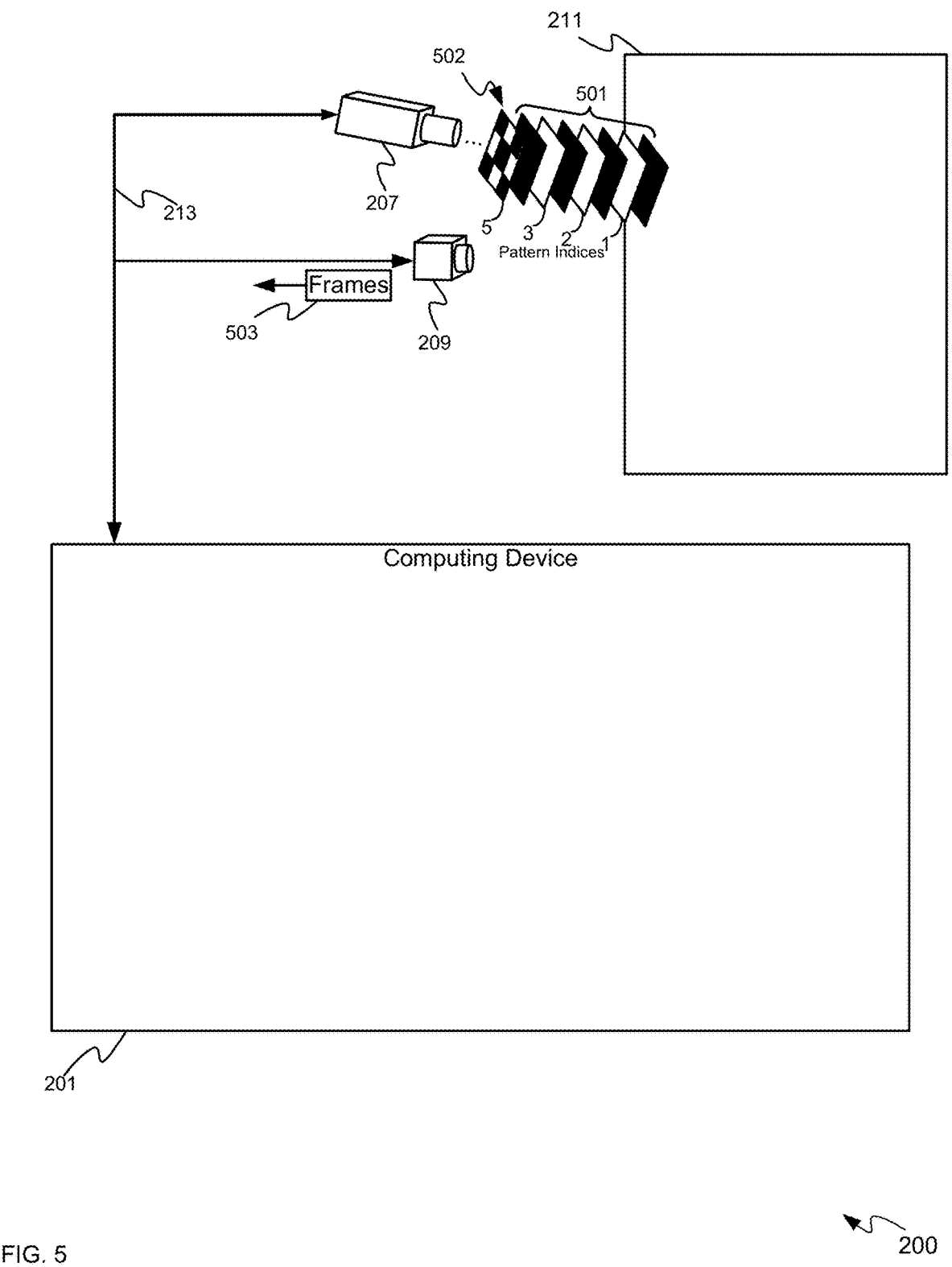
FIG. 5 depicts a projector of the system of FIG. 2 being controlled to project alternating patterns and structured light patterns, and a camera acquiring frames thereof, according to non-limiting examples.
Figure 6:
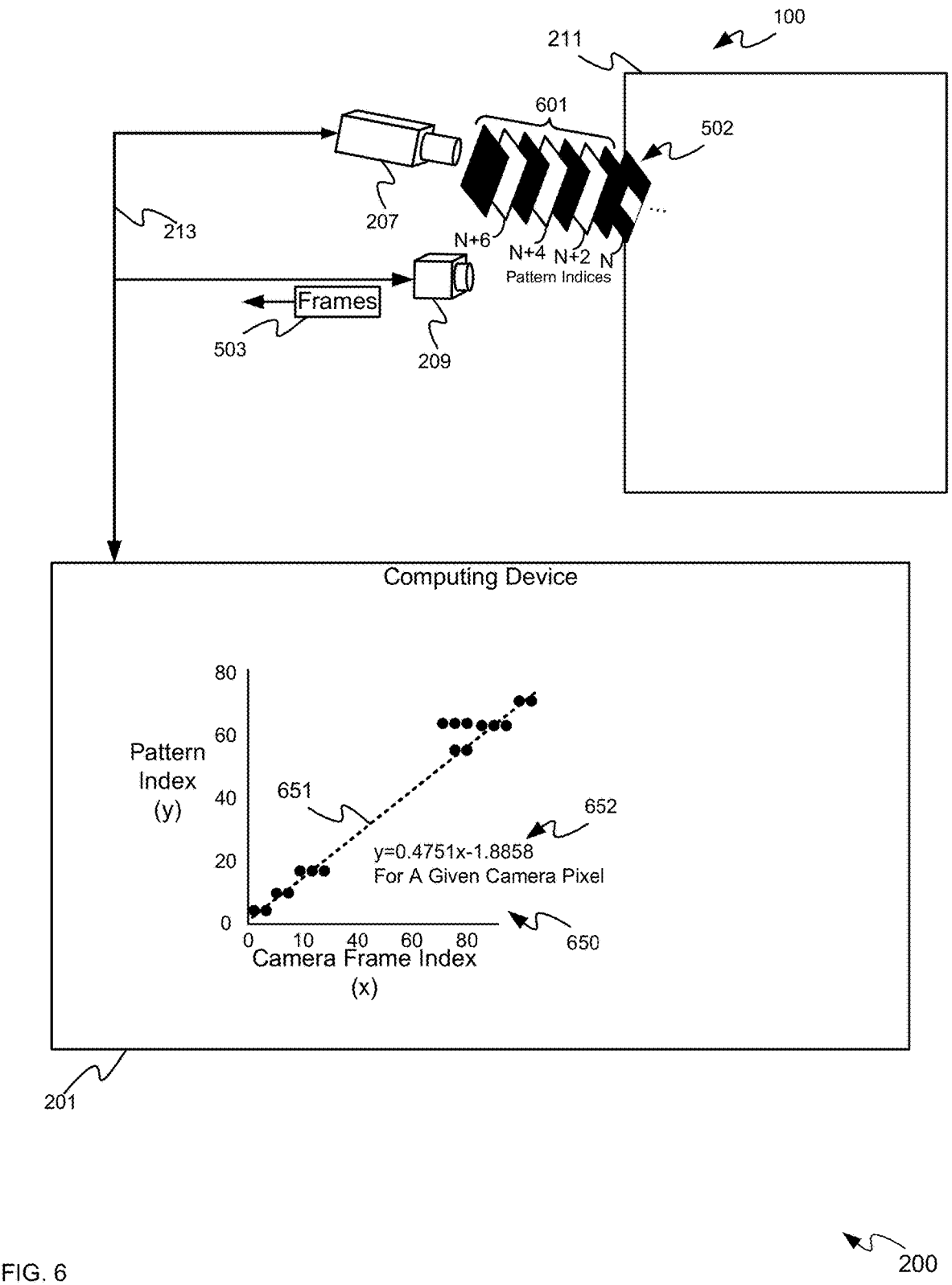
FIG. 6 depicts the projector of the system of FIG. 2 continuing to project alternating patterns and structured light patterns, and the camera continuing to acquire frames thereof, as well as a device generating a function relating respective indices of the alternating patterns and the frames, for a given camera pixel, according to non-limiting examples.
Figure 7:
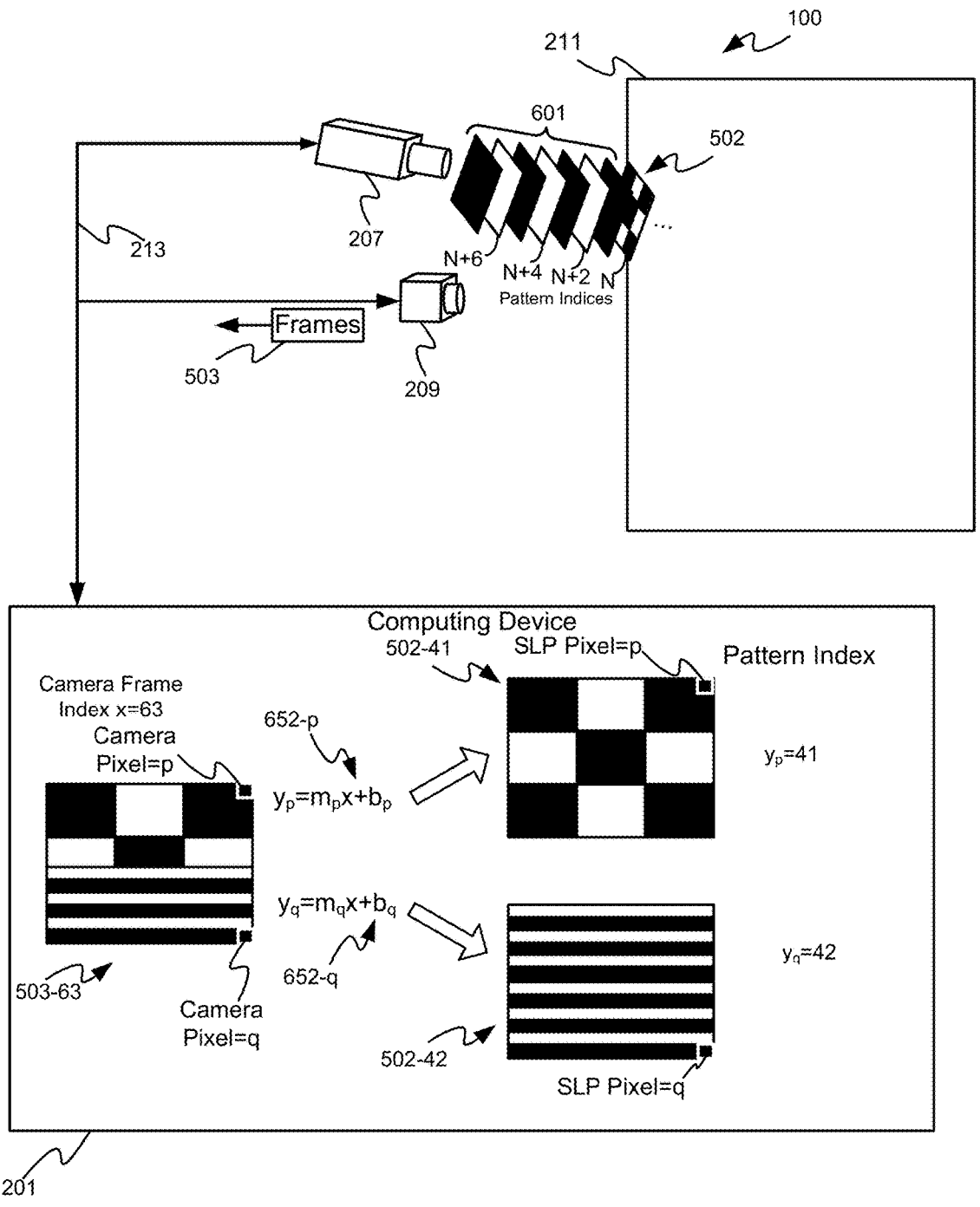
FIG. 7 depicts the device of the system of FIG. 2 using functions, relating respective indices of the alternating patterns and the frames, for given camera pixels, to relating frames with structured light patterns, according to non-limiting examples.

Attention is first directed to FIG. 5, FIG. 6 and FIG. 7, which depict the system 200. In FIG. 5, the projector 207 is being controlled to project first alternating patterns 501 (e.g. generated from the data 198) onto the object 211, the first alternating patterns 501 comprising a first black image, a first white pattern and/or image (e.g. having a pattern index of "2") etc. The pattern indices of the white patterns and/or images are also indicated. As depicted, after the first alternating patterns 501 are projected onto the object 211, the projector 207 projects structured light patterns 502 (e.g. generated from the data 199) onto the object 211. While one structured light pattern 502 is depicted (e.g. checkerboard), it is understood that a plurality of structured light patterns 502 are projected onto the object 211 (e.g. as indicated by an ellipsis; a pattern index ("5") of the first structured light pattern 502 is also shown.

While not depicted, the first alternating patterns 501 illuminate the object 211 accordingly. As depicted, the camera 209 acquires frames 503 of the patterns 501, 502, which are provided to the device 201.

FIG. 6 is similar to FIG. 5, however FIG. 6 depicts the projector 207 completing projection of the structured light patterns 502 (e.g. with a structured light pattern having a pattern index of "N", for example parallel black and white stripes) and then projecting second alternating patterns 601 (e.g. generated from the data 198) onto the object 211, the second alternating patterns 601 comprising a first black image, a first white pattern and/or image (e.g. having a pattern index of "N+2") etc. The pattern indices of the white patterns and/or images are also indicated. As depicted, the camera 209 continues to acquire the frames 503 of the patterns 502, 601 which are provided to the device 201.

As depicted, for a given camera pixel, the device 201 coordinates the indices of the frames 503 with the indices of the patterns 501, 601 to perform a linear regression which is depicted graphically in FIG. 6 as a graph 650. For example, as depicted, the graph 650 comprises, for the given camera pixel, a pattern index "y" plotted against the camera frame "x" of the alternating patterns 501, 601, the coordination occurring as described above (e.g. the device 201 searches for a first white pixel in the alternating patterns 501 and a last white pixel in the alternating patterns 601).

Camera frame indices that coordinate with respective pattern indices are depicted as solid circles on the graph 650. For example, as depicted, for each pattern index "y" on the graph 650, there are at least two camera frame indices "x" that coordinate with a given pattern index "y". Put another way, for each alternating pattern 501, 601 projected by the projector 207, the camera 209, as depicted, has acquired at least two corresponding frames 503; as depicted, for one of the alternating patterns 501 and one of the alternating patterns 601, the camera 209 has captured three corresponding frames 503.

As depicted, the device 201 has performed a linear regression on the camera frame indices that coordinate with respective pattern indices, for example to fit a line 651 thereto which is described by a function 652 (e.g. having the format of Equation (2) (e.g. with "m" having a value of 0.4751, and "b" having a value of −1.8858).

Hence, for a frame 503 having a camera frame index "x", the device 201 may use the function 652 to determine, for a given camera pixel, which pixel of a structured light pattern 502, having a corresponding pattern index "y", corresponds to the given camera pixel.

It is further understood that the device 201 may derive a similar function for each of the camera pixels.

It is understood that the device 201 may alternatively generate a function that has a format similar to the Equation (1), using the scan line numbers "$X_2$" of the frames 503, as well as the camera frame indices and the pattern indices of the patterns 501, 601, and use this function to determine, for a given scan line (and/or pixel thereof) $X_2$ of a frame 503 having a camera frame index of "x" (or "$X_1$" in the description of Equation (1)) and corresponds to pixel and/or scan line of a given structured light pattern 502 having a corresponding pattern index "y" (or "Y" in the description of Equation (1)).

An example of use of functions, similar to the function 652, is next described with respect to FIG. 7, which depicts the system 200, with the device 201 having generated a function 652-$p$ for a camera pixel "p" (e.g. a last pixel of a first scan line and/or row), with values for $m_p$ and $b_p$ having been determined using the frames 503 acquired by the camera 209 while the projector 207 was projecting the alternating patterns 501, 601, specifically for the camera pixel "p". Similarly, the device 201 has generated a function 652-$q$ for a camera pixel "q" (e.g. a last pixel of a last scan line and/or row), with values for $m_q$ and $b_q$ having been determined using the frames 503 acquired by the camera 209 while the projector 207 was projecting the alternating patterns 501, 601, specifically for the camera pixel "q". In particular, positions of the camera pixels "p" and "q" are shown at a camera frame 503-63 having a camera frame index of "x=63". Furthermore, the device 201 is attempting to coordinate the camera pixels "p" and "q" of the camera frame 503-63 with the structured light patterns 502.

In particular, as depicted, top and bottom halves of the camera frame 503-63 appear to have been acquired while the projector 207 was switching between projecting structured light patterns 502. For example, the top half of the camera frame 503-63 comprises part of checkerboard, while the bottom half of the camera frame 503-63 comprises part of a pattern of alternating black and white horizontal stripes. Such a frame 503-63 may be referred to as a blended frame as the frame 503-63 blends two structured light patterns 502.

However, each of the camera pixels "p" and "q" are associated with different functions 652-$p$, 652-$q$. Hence, when the camera frame index of "x=63" is input into the respective functions 652-$p$, 652-$q$, different pattern indices are generated. For example, when x=63 is input into the function 652-$p$, a pattern index of $y_p$=41 results, which, as depicted, corresponds to a structured light pattern 502-41 of a checkerboard. Similarly, when x=63 is input into the function 652-$q$, a pattern index of $y_q$=42 results, which, as depicted, corresponds to a structured light pattern 502-42 of alternating black and white horizonal stripes.

Hence, the camera pixel "p" of the frame 503-63 may be mapped to a projector pixel corresponding to a structured light pattern pixel "p" of the structured light pattern 502-41; similarly, the camera pixel "q" of the frame 503-63 may be mapped to a projector pixel corresponding to a structured light pattern pixel "q" of the structured light pattern 502-42. Such a mapping may be used in a larger mapping of projector pixels to camera pixels, etc., as described herein.

Furthermore, the coordination between the camera pixels and the projector pixels via the functions according to Equation (1) and/or Equation (2) may decrease a time to generate such a larger mapping.

Figure 8:
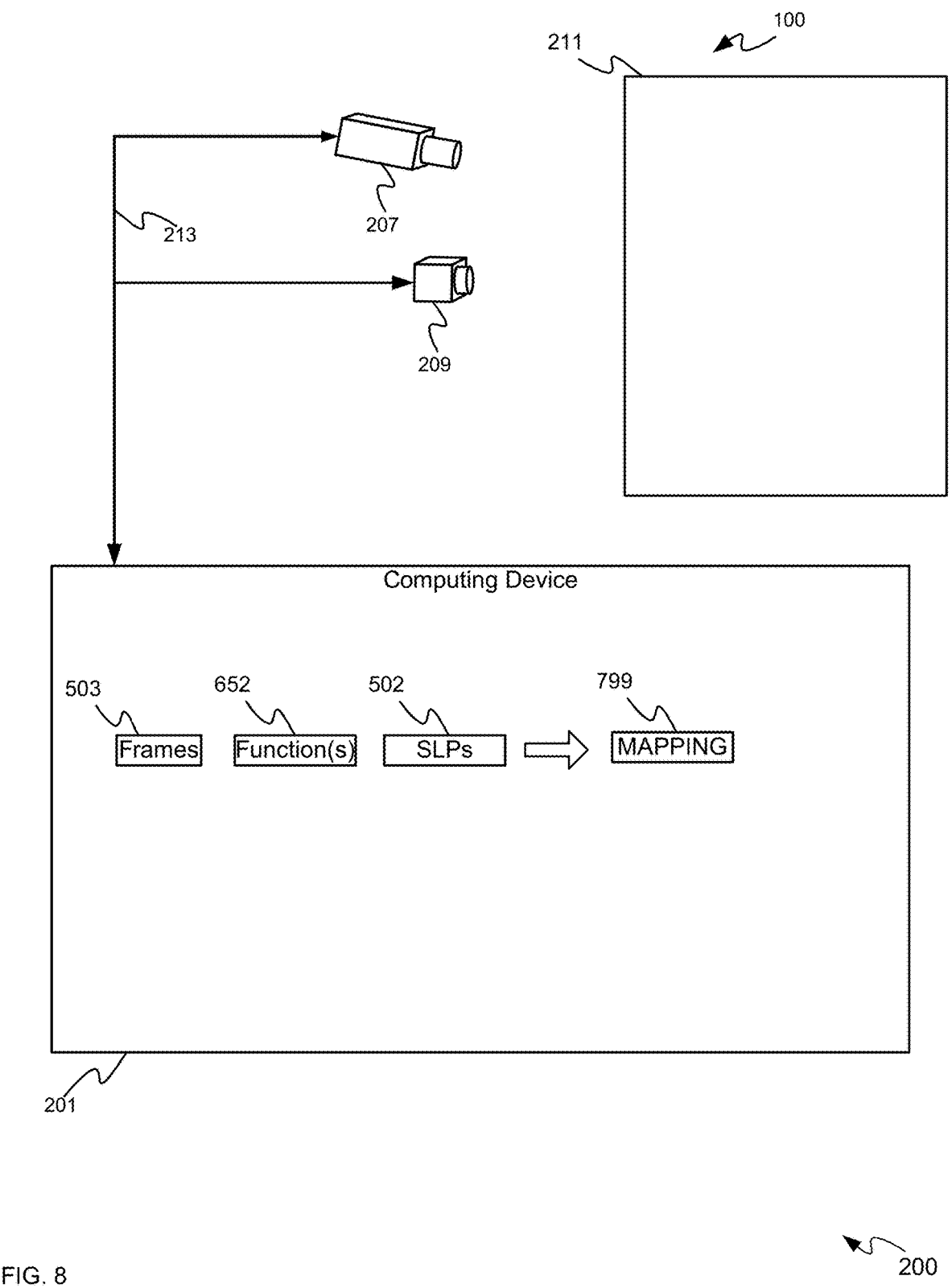
FIG. 8 depicts the device of the system of FIG. 2 generating a mapping of projector pixels to one or more of camera pixels and positions on an object in the overlapping fields-of-view, according to non-limiting examples.

For example, attention is next directed to FIG. 8 which depicts the device 201 using the frames 503, the function(s) 652, and the SLPs 502 to generate a mapping 799 of projector pixels to one or more of camera pixels and positions on the object 211, which may be used to at least partially determine the pose data 109$p$ (and/or be a component of the pose data 109$p$). For example, pixels of the frames 503 may be coordinated with the SLPs 502 using the functions 652 to generate the mapping 799. Such a situation may be used to decrease the calibration time of the system 200 and/or the system 100 as compared to controlling the projector 207 to hold an SLP 502 until, for example, a confirmation of the camera 209 capturing a respective frame 503 thereof can be obtained.

However, to perform such a coordination, the projector pattern duration time of the projector 207 and/or the frame rate of the camera 209 may be generally controlled such that the camera 209 unambiguously acquires frames of the alternating patterns 501, 601 and the structured light patterns 502.

Figure 9:
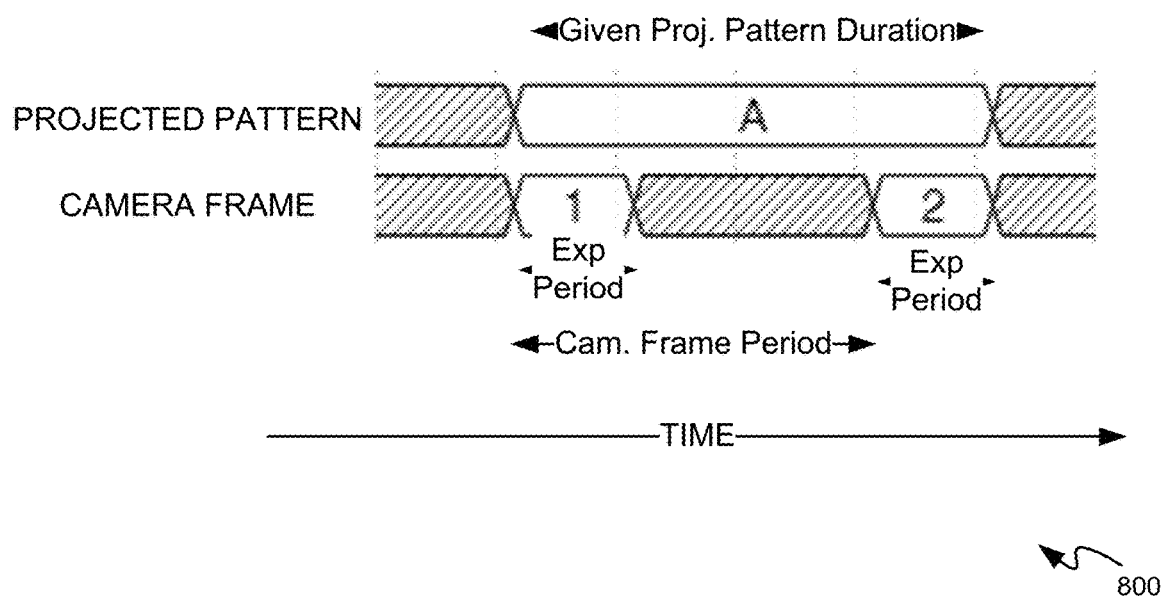
FIG. 9 depicts a timing diagram comparing projected pattern durations with camera frame and exposure period durations, according to non-limiting examples.

For example, attention is next directed to FIG. 9 which depicts a timing diagram 800 showing timing for projected patterns of the projector 207 (e.g. for white and black alternating patterns, with a time period that a white pattern is being projected labelled as "A"), and camera frames acquired by the camera 209 (e.g. for two frames labelled "1" and "2"). As depicted, the patterns projected by the projector 207, including the white pattern, "A", are projected for a given projector pattern duration (e.g. a projector frame period); for example, the projector 207 may have a minimum projector pattern duration, and the given projector pattern duration may be at least the minimum projector pattern duration, or larger. Ideally the projector pattern duration is minimized for rapid projection of the alternating patterns and the structured light patterns. The projector pattern duration may be controlled, for example, by controlling the projector frame rate and/or a number of projector frames used to project a pattern, as described above. The projector frame rate may or may not be controllable, depending on a type and/or model of the camera 209.

As depicted, a camera frame period is also indicated that includes the frame "1", with exposure periods for each of the frames "1" and "2" also indicated. It is understood that the frame "2" is part of a next camera frame period (e.g. relative to the indicated frame period). The exposure period generally comprises a portion of the camera frame period during which a frame is acquired (e.g. exposure period generally comprises a portion of the camera frame period during which the CCD of the camera 209 is "exposed"). The remainder of the camera frame period is generally "dead" with respect to acquiring frames (e.g. as the camera 207 processes the frame acquired during the exposure period and/or prepares to acquire a next frame). The camera frame period may be controlled, for example, by controlling the camera frame rate. The camera exposure time may or may not be controllable, depending on a type and/or model of the camera 209. The camera frame rate also may or may not be controllable, depending on a type and/or model of the camera 209.

In general, to maximize a number of frames acquired by the camera 209 for a given pattern, the controller 320 and/or the device 201 generally controls the projector pattern duration and/or a camera frame rate and/or a camera exposure time (and/or a relative delay time, described below) such that the projector pattern duration is greater than a camera frame period plus a camera exposure period. For example, and put another way, as depicted in the timing diagram 800, the indicated camera frame period (which includes the frame "1") plus the exposure period for the next frame "2" is generally less than the given projector pattern duration. Put yet another way, the projector pattern duration and/or the camera frame rate and/or the camera exposure time may be controlled to fit as many exposure periods into the projector pattern duration as possible and/or to maximize a number of the frames of the alternating patterns (e.g. to get a better regression when generating functions, as described above).

However, such control generally also occurs to minimize a respective number of frames which overlap adjacent patterns. For example, with brief reference back to FIG. 7, the frame 503-63 overlapped the structured light patterns 501-41, 501-42 and hence when the functions 652-pm 652-q were generated it is likely that frames 503 acquired by the camera 209 overlapped adjacent alternating patterns 501, 601. As the data in such situations can be more difficult to process and/or lead to errors; hence, control of the projector pattern duration and/or the camera frame rate and/or the camera exposure time may be generally also to minimize a respective number of frames which overlap adjacent patterns. However, the condition that the projector pattern duration be greater than a camera frame period plus a camera exposure period may also result in minimizing a respective number of frames which overlap adjacent patterns.

It is further understood that when a frame overlaps adjacent "white" and "black" alternating patterns, a pixel of a frame may be coordinated with the white or black pattern using thresholding techniques. For example, a pixel may be determined to correspond with a white pattern when an RGB value of the pixel is, on average, white, and/or is in a range of RGB associated with white; similarly, a pixel may be determined to correspond with a black pattern when an RGB value of the pixel is, on average, black, and/or is in a range of RGB associated with black.

It is also understood that due to the alternating patterns 501, 601 being for a given projector pattern duration, and the frames 503 being acquired for a given exposure period, and the possibility of frames overlapping alternating patterns 501, 601 (e.g. white and black patterns), in some examples a minimum number of alternating patterns 501, 601 may be used to ensure sample robustness. For example, at least three white (and the like) patterns may be used in each of the alternating patterns 501, 601 to ensure that the regression is accurate. While a smaller number may be used, more error may be introduced; similarly, while a larger number may be used, more time to acquire the frames for the alternating patterns 501, 601 is introduced, which can increase an overall calibration time.

In some examples, the relative phase and/or delay time between the patterns 501, 502, 601 and the frames 503 may also be controlled. In particular examples, relative phases may be controlled by adjusting the projector pattern duration time and/or the camera frame rate.

Figure 10:
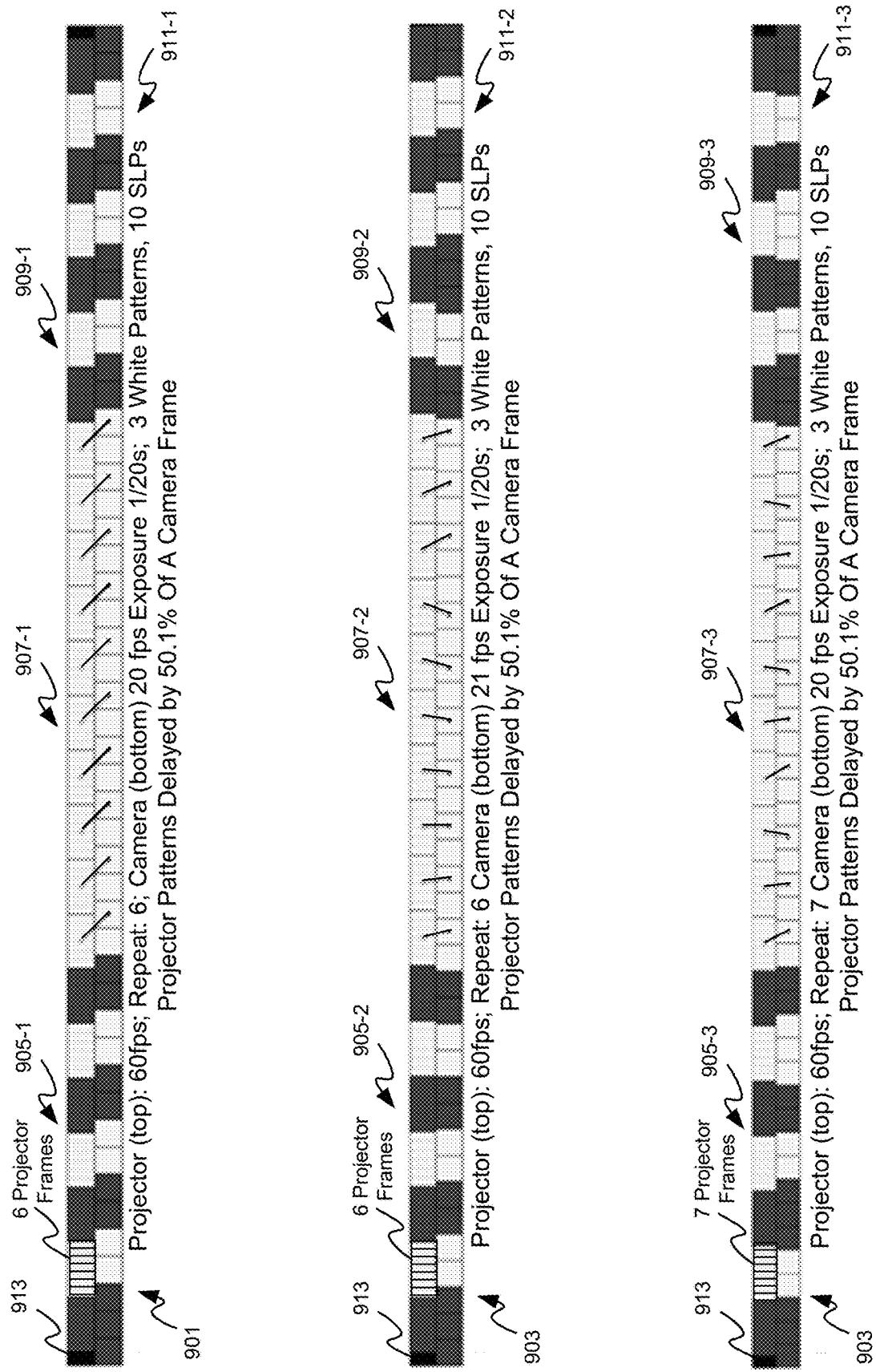
FIG. 10 depicts timing diagrams comparing projected pattern durations with camera frames period durations.

For example, attention is next directed to FIG. 10 which depict three timing diagrams 901, 902, 903 showing, in a respective top row, projected patterns, with three respective white patterns 905-1, 905-2, 905-3 (alternating with black patterns) projected before respective SLPS 907-1, 907-2, 907-3, and three respective white patterns 909-1, 909-2, 909-3 (alternating with black patterns) projected after the respective SLPS 907-1, 907-2, 907-3. The white patterns 905-1, 905-2, 905-3, 909-1, 909-2, 909-3 are interchangeably referred to hereafter, collectively as the white patterns 905, 909 (and/or white patterns 905 and white patterns 909), and, generically as a white pattern 905, 909 (and/or a white pattern 905 and a white pattern 909). Similarly, the SLPS 907-1, 907-2, 907-3 are interchangeably referred to hereafter, collectively as the SLPs 907 and, generically as an SLP 907.

As depicted a given SLP 907 is indicated by a white rectangle surrounded by a dark line. Hence, for example, in each of the timing diagrams 901, 902, 903, there are ten SLPs 907 being projected.

Furthermore, a projector pattern duration of the patterns 905, 907, 909 is controlled via projector frames; for example, as indicated in detail shown on the left side of each of the timing diagrams 901, 902, each of the patterns 905, 907, 909 of the timing diagrams 901, 902 comprises six projector frames; similarly, as indicated in detail shown on the left side of the timing diagram 903, each of the patterns 905, 907, 909 of the timing diagram 903 comprises seven projector frames. Hence, the projector pattern duration of the patterns 905, 907, 909 of the timing diagram 903 is one projector frame longer than the projector pattern duration of the patterns 905, 907, 909 of the timing diagrams 901, 902.

In a bottom row of the timing diagrams 901, 902, 903, camera frames 911-1, 911-2, 911-3 (interchangeably referred to hereafter, collectively as the camera frames 911 and, generically as a camera frame 911) are depicted as squares, with white squares corresponding to frames in which a white pattern 905, 909 or an SLP 907 is acquired (e.g. and which may be determined using thresholding). For example, as depicted, at least two frames 911 are acquiring a respective pattern 905, 907, 909. In the timing diagram 903, it is understood that three frames 911-3 are acquiring the second last white pattern 909-3 as three white squares representing frames 911-3 are about aligned with the second last white pattern 909-3.

In particular, the relative overlap between the frames 911 and the patterns 905, 907, 909 is depicted via the relative positions of the respective edges of squares of the frames 911 and the patterns 905, 907, 909. Furthermore, to aid in the present discussion, lines between the SLPs 907 in the top row and every second frame 911 in the bottom row indicates a second frame 911 that at least partially acquire the SLPs 907 to which a line extends therebetween.

Adjacent each of the timing diagrams 901, 902, 903 is text providing respective detail thereof. For example, a projector frame rate of each of the timing diagrams 901, 902, 903 is 60 frames per second (fps), and a repeat value indicates numbers of projector frames per pattern 905, 907, 909 (e.g. 6 frames in the timing diagrams 901, 902, and 7 frames in the timing diagram 903). The camera frame rate for each of the timing diagrams 901, 903, is 20 frames per second, but the camera frame rate for the timing diagram 902 is 21 frames per second. The exposure time for each of the timing diagrams 901, 902, 903 is ½0th of a second. Similarly, there are 3 white patterns 905 and 3 white patterns 909, and 10 SLPs 907.

Furthermore, a delay (e.g. relative phase) of 50.1% has been introduced between the projector patterns 905, 907, 909 and the frames 911 (e.g. a beginning of a black pattern 905 occurs 50.1% later than the first frame 911 as indicated by a darker rectangle 913 at the start of each of the top rows of the timing diagrams 901, 902, 903). Such a situation is selected deliberately for illustrative purposes as having a delay of greater than 50% with pattern durations generally matching an integer number of a camera frame duration, as in the timing diagram 901, may maximized blended frames 911.

For example, in the timing diagram 901, as the projector frame rate is 60 fps, and 6 projector frames are used to project a pattern 905-1, 907-1, 909-1, the pattern duration is 1 second; similarly, as the camera frame rate is 20 fps, and 2 camera frames 911 are used to acquire a pattern 905-1, 907-1, 909-1, the relative camera frame duration is also 1 second. As the delay is 50.1% there between, the respective second frames 911-1 acquiring the SLPs 907-1, as indicated by the lines therebetween, have about a 50% overlap between adjacent SLPs 907-1. Such a situation leads to maximizing blended frames 911-1 (e.g. frames 911-1 that acquire at least two SLPs 907-1) and may lead to maximizing errors.

To address this situation, and to change the relative phase between the projector 207 and the camera 209 (e.g. relative to the timing diagram 901), in the timing diagram 902, the camera frame rate is increased to 21 fps (as compared to 20 fps in the timing diagram 902), which results in reducing respective blended second frames 911-2 acquiring the SLPs 907-2, as indicated by the lines therebetween. While some of the frames 911-2 are still blended, the overlap between the frames 911-2 and the SLPs 907-2 are not 50% but include more of one SLP 907-2 then an adjacent SLP 907-2.

Alternatively, to address this situation, and to change the relative phase between the projector 207 and the camera 209 (e.g. relative to the timing diagram 901), in the timing diagram 903, the projector pattern duration is increased to 7 projector frames (as compared to 6 projector frames in the timing diagram 901), which also results in reducing respective blended second frames 911-3 acquiring the SLPs 907-3, as indicated by the lines therebetween. While some of the frames 911-3 are still blended, the overlap between the frames 911-3 and the SLPs 907-3 are not 50% but include more of one SLP 907-3 then an adjacent SLP 907-3.

Hence, in general, the projector pattern duration, the camera frame rate, and/or the exposure time (and/or the relative phase and/or delay time), may be controlled to reduce and/or minimize a respective number of frames 911 which overlap adjacent SLPs 907.

In some examples, with further reference to FIG. 10, and as mentioned above, the patterns (e.g. the patterns 905, 907, 909) may be produced via a color wheel, and the like in the projector 207, such that white in the patterns 905, 907, 909 occur via projection of red, green and blue bitplanes. As such, depending on timing between the exposure time of the frames 911 and the patterns 905, 907, 909, color of the frames 911 acquiring the white patterns 905, 909 may be a color other than white. Hence, for example, if the white patterns 905, 909 are projected by projecting, in order, a red bitplane, a green bitplane and a blue bitplane, frames 911 having red color or a blue color, and the like, may be assigned a fractional camera frame index; for example, if a nominal whole number camera frame index is "1" than a frame 911 having a red color may be assigned a fractional camera frame index of 0.8 (e.g. less than "1"), and a frame 911 having a blue color may be assigned a fractional camera frame index of 1.2 (e.g. greater than "1"). Various colors may be assigned fractional correction factors; in the above example red may be assigned a fractional correction factor of −0.2, and blue may be assigned a fractional correction factor of +0.2; hence, when a frame 911 is not "white" but a given color associated with a respective fractional correction factor, the respective fractional correction factor to the nominal assigned camera frame index. The method 300 may be adapted accordingly.

As should by now be apparent, the operations and functions of the devices described herein are sufficiently complex as to require their implementation on a computer system, and cannot be performed, as a practical matter, in the human mind. In particular, computing devices such as set forth herein are understood as requiring and providing speed and accuracy and complexity management that are not obtainable by human mental steps, in addition to the inherently digital nature of such operations (e.g., a human mind cannot interface directly with digital projectors, digital cameras, RAM or other digital storage, cannot transmit or receive electronic messages, electronically encoded images and/or video, electronically encoded audio, etc., among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A device comprising:
a controller configured to communicate with a projector and a camera having overlapping fields-of-view, the controller configured to:
control the projector to project, while the camera acquires frames thereof, in a sequence: alternating patterns; and structured light patterns, the alternating patterns comprising first predetermined patterns and second predetermined patterns projected one or more of before and after the structured light patterns;
determine, using the frames as coordinated with the alternating patterns, one or more functions relating respective indices of the alternating patterns and the frames, on one or more of a camera pixel-by-pixel basis and a camera scan-line-by-scan-line basis; and
generate, and store, at a memory, a mapping of projector pixels to one or more of camera pixels and positions on an object in the overlapping fields-of-view, based on relating the frames with the structured light patterns using the one or more functions.

2. The device of claim 1, wherein the structured light patterns are configured to uniquely illuminate different portions of one or more of the overlapping fields-of-view and the object.

3. The device of claim 1, wherein the alternating patterns comprises: a first set of the first predetermined patterns and the second predetermined patterns projected before the structured light patterns; and a second set of the first predetermined patterns and the second predetermined patterns projected after the structured light patterns.

4. The device of claim 3, wherein the first set and the second set of the first predetermined patterns and the second predetermined patterns respectively comprise: three of the first predetermined patterns which alternate with the second predetermined patterns therebetween.

5. The device of claim 1, wherein the controller is further configured to coordinate the frames with the alternating patterns by identifying one or more of: an initial first predetermined pattern projected before the structured light patterns; and a last first predetermined pattern projected after the structured light patterns.

6. The device of claim 1, wherein the controller is further configured to control one or more of a projector pattern duration, a camera frame rate and a camera exposure time to one or more of: maximize a number of the frames of the alternating patterns; minimize a respective number of frames which overlap adjacent patterns; and control the projector pattern duration to be greater than a camera frame period plus a camera exposure period.

7. The device of claim 1, wherein the one or more functions comprise a single function which relates a camera frame index, a pattern set index and a scan line number.

8. The device of claim 1, wherein the one or more functions comprise a plurality of functions which relates a camera frame index to a pattern set index for one or more of each camera pixel and each camera scanline.

9. The device of claim 1, wherein the controller is further configured to assign a fractional index to one or more of the frames, pixels and scan lines thereof, on a basis of respective colors thereof, to determine the one or more functions relating the respective indices of the alternating patterns and the frames.

10. A method comprising:
controlling, at a computing device, a projector to project, while a camera acquires frames thereof, in a sequence: alternating patterns; and structured light patterns, the alternating patterns comprising first predetermined patterns and second predetermined patterns projected one or more of before and after the structured light patterns; the projector and the camera having overlapping fields-of-view;
determining, at the computing device, using the frames as coordinated with the alternating patterns, one or more functions relating respective indices of the alternating patterns and the frames, on one or more of a camera pixel-by-pixel basis and a camera scan-line-by-scan-line basis; and
generating, at the computing device, and storing at a memory, a mapping of projector pixels to one or more of camera pixels and positions on an object in the overlapping fields-of-view, based on relating the frames with the structured light patterns using the one or more functions.

11. The method of claim 10, wherein the structured light patterns are configured to uniquely illuminate different portions of one or more of the overlapping fields-of-view and the object.

12. The method of claim 10, wherein the alternating patterns comprises: a first set of the first predetermined patterns and the second predetermined patterns projected before the structured light patterns; and a second set of the first predetermined patterns and the second predetermined patterns projected after the structured light patterns.

13. The method of claim 12, wherein the first set and the second set of the first predetermined patterns and the second predetermined patterns respectively comprise: three of the first predetermined patterns which alternate with the second predetermined patterns therebetween.

14. The method of claim 10, further comprising coordinating the frames with the alternating patterns by identifying one or more of: an initial first predetermined pattern projected before the structured light patterns; and a last first predetermined pattern projected after the structured light patterns.

15. The method of claim 10, further comprising controlling one or more of a projector pattern duration, a camera frame rate and a camera exposure time to one or more of: maximize a number of the frames of the alternating patterns; minimize a respective number of frames which overlap adjacent patterns; and control the projector pattern duration to be greater than a camera frame period plus a camera exposure period.

16. The method of claim 10, wherein the one or more functions comprise a single function which relates a camera frame index, a pattern set index and a scan line number.

17. The method of claim 10, wherein the one or more functions comprise a plurality of functions which relates a camera frame index to a pattern set index for one or more of each camera pixel and each camera scanline.

18. The method of claim 10, further comprising assigning a fractional index to one or more of the frames, pixels and scan lines thereof, on a basis of respective colors thereof, to determine the one or more functions relating the respective indices of the alternating patterns and the frames.

* * * * *